June 7, 1955  W. L. FRITZ ET AL  2,710,117

SPREADER CART WITH AGITATING MEANS

Filed Jan. 8, 1954

INVENTORS
William L. Fritz.
John Millar, Jr.

BY Cameron, Kerkam & Sutton
ATTORNEYS 2,710,117
Patented June 7, 1955

2,710,117

SPREADER CART WITH AGITATING MEANS

William L. Fritz and John Millar, Jr., Harrisburg, Pa., assignors to Jackson Manufacturing Co., Harrisburg, Pa., a corporation of Pennsylvania Application January 8, 1954, Serial No. 402,848

4 Claims. (Cl. 222—177)

This invention relates to improvements in spreader-carts of the type designed to transport and distribute fertilizer, lime and analogous substances over lawns and similar surfaces.

Considerable difficulty has been experienced in the past in the use of such spreader-carts due to the tendency of lime and various of the fertilizers to "bridge" or "arch" over the agitator blades located in the lower extremity of the cart above the egress vents, which "bridging" interrupts the flow of material from the cart and results in uneven distribution thereof.

It is the primary object of this invention, therefore, to provide improved oscillator means in the lower extremity of the cart, above the agitating feed blades thereof and actuated thereby, to maintain the lower portion of the material in the cart in free and fluent condition and to prevent "bridging" or "arching" thereof over the feed blades.

It is a further object of this invention to provide such a structure which may be readily installed in any spreader-cart of the type and which will eliminate "bridging" and assure an even flow of material to the agitator blades and thence to the surface of the ground.

Another object of this invention is to provide such an oscillator structure which will be automatically actuated by the agitator blades and which will be positive in its action regardless of the direction of movement of the spreader cart.

Other and further objects of this invention will become apparent as this specification proceeds.

Figure 1:
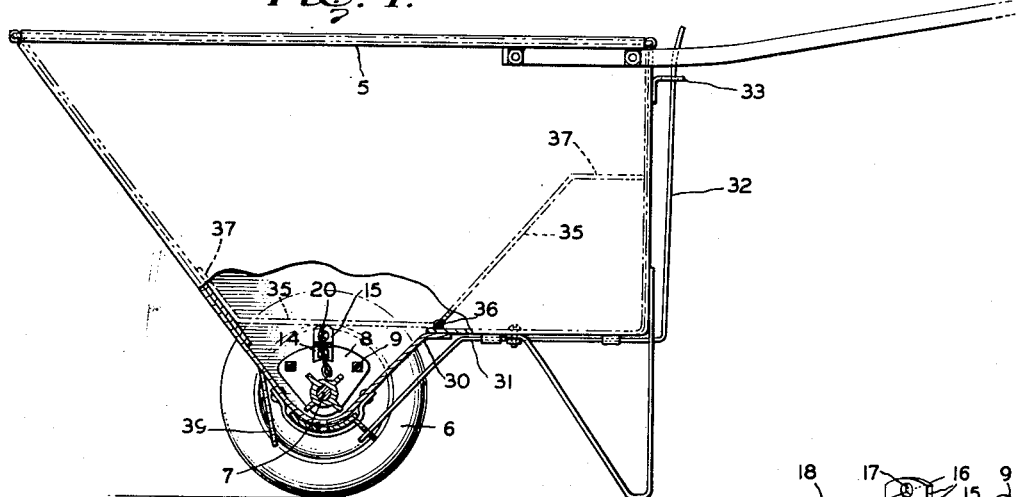
Figure 2:
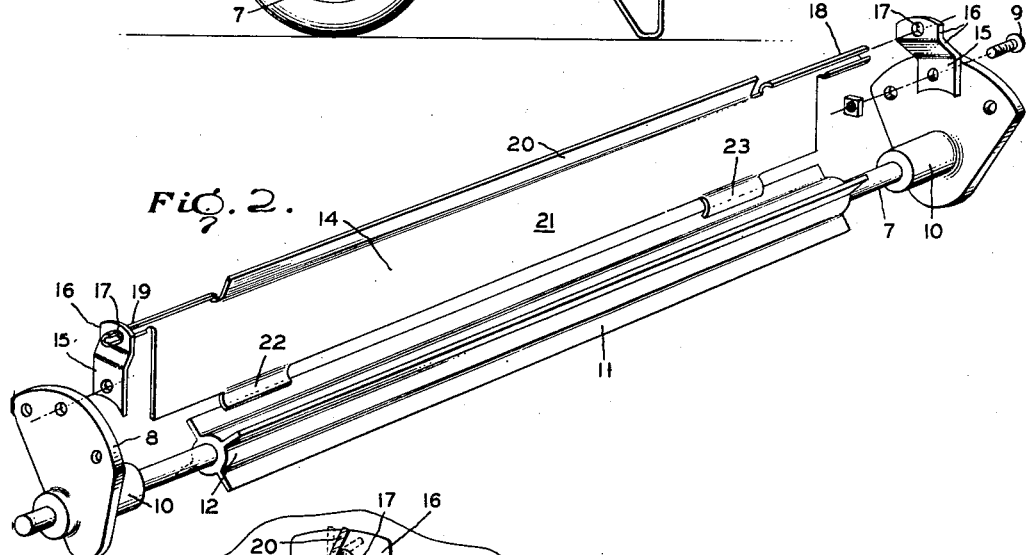
Figure 3:
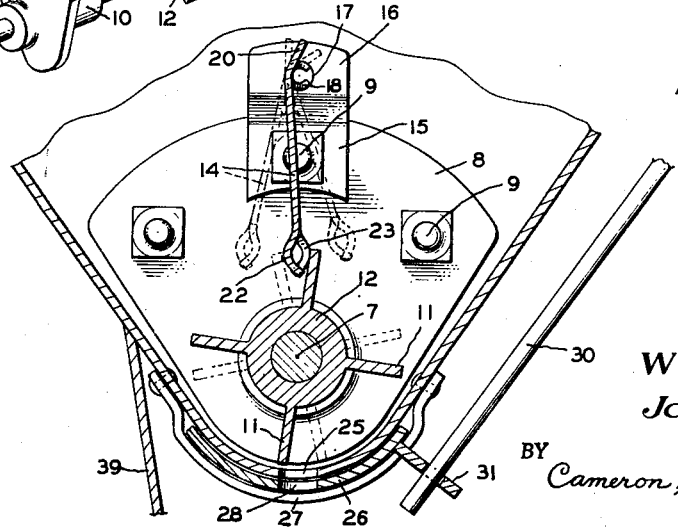

Referring to the drawings, Fig. 1 is a side view, partially broken away and in section, showing the improved oscillator blade installed in a four-blade spreader cart;

Fig. 2 is an exploded perspective view of the improved oscillator agitator blade in position above the agitator blades of a spreader cart, showing the attaching brackets therefor and with the oscillator blade in operating position above the agitator blades, and Fig. 3 is a detailed cross-sectional view of the lower extremity of a spreader cart showing the oscillator blade in operative position therein above and in contact with the agitator blades.

In the drawings, wherein like reference characters indicate like parts, 5 indicates a spreader cart body. Cart body 5 is movably supported on wheels 6 which are affixed to axle 7 which is rotatably mounted in brackets 8 and extends laterally across the entire width of cart 5 at its lower reduced extremity. As shown, brackets 8 are affixed to the lower lateral walls of cart 5 by appropriate bolts 9 and are bored and extended at their centers into cylindrical bearings 10 which rotatably support axle 7 at its lateral extremities within the body of cart 5. Wheels 6 are fixedly mounted on the outer extremities of axle 7 so that axle 7 will rotate with them.

Fixedly mounted across the width of axle 7 are rectangularly disposed agitator blades 11 which are made integral with cylindrical housing 12 which is permanently affixed over axle 7 and which extends the entire width of the lower extremity of the cart body and bears at its outer extremities against the faces of bearings 10. As shown, blades 11 are preferably four in number and are affixed to housing 12 at right angles to each other, extending the full width thereof. Blades 11 are of a height to sweep closely the lower curved walls of cart 5 in passing through the lower 180° of their rotation. Blades 11 are preferably rectangular in cross section. One full rotation of blades 11 and axle 7 results from each rotation of wheels 6 affixed at the extremities of axle 7.

Oscillator blade 14 is shown pivotally affixed across the lower extremity of cart 5 as by brackets 15 which are preferably flattened at their lower extremities to closely fit the upper surfaces of bearing brackets 8 and are bored to allow passage of bolts 9, holding bearing brackets 8 to the walls of the cart. The upper extremities 16 of brackets 15 are preferably angled inwardly and then upwardly in a vertical plane, their surfaces being bored at 17 to receive cylindrical bearing extremities 18 and 19 of oscillator blade 14.

Oscillator blade 14, as shown, is preferably rectangular in shape, its two lateral upper extremities being cut and rolled over to form cylindrical bearings 18 and 19 which fit into circular recesses 17 in the upper vertical surfaces 16 of supporting brackets 15 disposed adjacent the opposed side walls of the body of cart 5. Oscillator blade 14 is provided along its central upper edge with an angular agitating segment 20 which is preferably inclined with respect to the main body 21 of blade 14 at an angle of approximately 45°, to augment the agitating action of the blade 14. The main body 21 of blade 14 is preferably plane, as shown, and rectangular in shape, extending substantially the full width of the restricted bottom of the cart which houses agitator blades 11.

At its lower, lateral extremities blade body 21 is provided with opposed concave and convex finger or contact members 22 and 23, whose curved inner surfaces are in opposition to each other. As shown, concave finger 20 depends downwardly from the lower lateral edge of body 21 of blade 14 and convex finger 23 depends downwardly an equal distance, from the opposite lower edge of blade body 21. Thus it will be seen that when agitator blades 11 are rotating in a clockwise direction the outer, convex surface of finger 23 will be contacted first by the upper edge of blades 11 and when blades 11 are rotating in a counterclockwise direction the outer, convex face of concave finger 22 will be first contacted by the upper edge of blades 11.

Agitator blade 14 normally lies in a vertical plane passed through the axis of axle 7 and in repose hangs suspended in brackets 15 in a vertical position.

Other details of cart 5 are shown in the drawing. Thus, as will be seen from Figs. 1 and 3, the curved bottom extremity of cart 5 is provided with a series of circular egress perforations 25 which extend completely across the width of the bottom of the cart. Egress of material from the cart through these perforations 25 is controlled by means of a curved valve plate 26 which extends across the width of the bottom of the cart and is slidably maintained against the bottom of the cart by means of a series of curved valve brackets 27 which are bolted or otherwise affixed over valve plate 26 to the lower, outer walls of the cart bottom. Valve plate 26 carries a series of perforations 28 of the same size as the orifices 25 in the bottom of the cart. The amount of material issuing from the bottom of the cart is controlled by the position of the valve plate 26 and its perforations 28 with respect to the perforations 25 in the bottom of the cart. By moving valve plate 26 laterally the bottom of the cart may be completely closed by closing egress from orifices 25 and 28 or it may be adjusted to full open or partially open positions. Lateral movement of valve plate 26 is controlled through pivoted valve lever 30 which at its lower extremity registers with a projecting stud 31 extending outwardly from valve plate 26. Control lever 30 is pivotally mounted to the lower surface of cart body 5 at 31 and extends to a rectangular section 32 which passes up the rear face of the cart 5 and into a toothed bracket 33 in which its relative lateral position is maintained. Lateral movement of the upper extremity of section 32 of valve control rod 30 thus will determine the position of the orifices 28 of valve plate 26 with respect to orifices 25 in the cart body and will thus control the flow of material from the cart.

Means are provided in the bottom of the cart to close off the agitating and distributing mechanism when it is desired to use the cart merely as a barrow for transporting material, without distributing it. This means comprises broadly an angular plate 35 which is pivotally mounted across the lower extremity of the cart body at hinge line 36 and which carries angular extremity 37 designed to register with the forward inner wall of cart 5 when the plate is in forward position to cut off the distributing mechanism in the lower extremity of the cart. With plate 35 swung rearwardly the material in the cart will fall by gravity into the agitating and distributing mechanism for distribution through the bottom of the cart. With plate 35 in forward position the distributing mechanism is cut off from the body of the cart and the cart may be used for transport purposes. Plate 35 extends the entire width of the cart from lateral wall to lateral wall thereof and is moved forwardly or rearwardly by hand.

Baffle board 39 is provided bolted across the width of the cart just forwardly of valve plate brackets 27. It extends the entire width of the cart and depends downwardly below plate 26 an appreciable distance to serve as a wind break to prevent blowing away of the material issuing through the orifices in the bottom of the cart and the valve plate. It also serves to insure uniform spreading of the material issuing from the bottom of the cart.

As has been previously indicated, oscillator blade 14 is movably suspended in brackets 15 by means of its cylindrical bearing extremities 18 and 19. Oscillator blade 14 is hung above rectangular agitator blades 11 in such fashion that its depending curved fingers 22 and 23 fall below the upper extremities of blades 11 in position to be contacted thereby along their medial lines as blades 11 move either in a clockwise or counterclockwise direction. Thus, when the blades 11 move in a clockwise direction, with forward movement of the cart, the upper extremities thereof will contact the outer convex face of finger 23 to swing oscillator blade 14 forwardly through an arc of approximately 20° to agitate the material in the cart as it moves downwardly by gravity and thus prevents "arching" of the material over the agitator blades. Conversely, when the cart is moved rearwardly and agitator blades 11 rotate in a counterclockwise direction, the outer, convex face of depending finger 22 will be contacted by the rear surfaces of blades 11 and the oscillator blade will be moved rearwardly thereby and oscillated through a similar arc by this rearward movement of the blades. This oscillation agitates the lower layers of material in the cart above agitator blades 11 and prevents "arching" of the material thereover.

This improved agitator mechanism positively prevents "arching" of the material over the agitator blades and assures an even flow of material downwardly by gravity to the agitator blades and an even flow of the material through the ports 25 and 28 at the bottom of the cart. It thus eliminates faulty distribution of material and maintains the entire load in the lower extremity of the cart in fluid and easily distributable condition.

The oscillator blade 14 is constantly oscillated by blades 11 during both forward and backward movement of the cart and its angular upper extremity 20 further assists in this agitating and loosening action. With the improved agitator installed, constant flow and even distribution of the material in the cart downwardly to the agitator blades is assured and proper functioning of the distributing mechanism is assured at all times.

The invention is susceptible of numerous embodiments without departing from the spirit thereof. The dimensions of the agitator blade may be varied within a wide range without departing from the spirit of the invention. The manner of suspending the blade for oscillation in the bottom of the cart may be varied as desired.

Equivalents may be substituted for the various elements of the combination without departing from the spirit of the invention.

Attention is directed to the appended claims for a limitation of the scope of this invention.

What is claimed is:

1. In a spreader cart of the two wheeled type, an axle extending through said cart rotatable with the wheels thereof, agitator blades affixed over said axle, a freely swinging, vertically disposed flattened oscillator blade pivotally suspended across and extending the width of said cart above said agitator blades, curved fingers depending from the lower, lateral extremities of said oscillator blade extending downwardly to a point where they are contacted by said agitator blades whereby said oscillator blade is swung arcuately by contact of said fingers with said agitator blades to stir and prevent arching of the material in the cart over said agitator blades.

2. In a spreader cart of the two wheeled type, an axle extending through said cart rotatable with the wheels thereof, rectangular agitator blades affixed over said axle, an oscillator blade pivotally suspended at its upper, lateral extremities across the width of said cart and extending the full width of said cart above said agitator blades, depending fingers extending downwardly from said oscillator blade to a point where they are contacted by said agitator blades whereby said oscillator blade is swung arcuately by rotation of said agitator blades to prevent arching of the material in the cart over said agitator blades.

3. In a spreader cart of the two wheeled type, an axle extending through said cart rotatable with the wheels thereof, agitator blades affixed over said axle, a rectangular, angularly shouldered oscillator blade pivotally suspended at its upper extremities across the width of said cart above said agitator blades, opposed, curved fingers disposed at the lower, lateral extremities of said oscillator blade extending downwardly to a point where their lower extremities are contacted by said blades whereby said oscillator blade is swung arcuately by rotation of said agitator blades to prevent arching of the material in the cart over said agitator blades and to maintain it free-flowing.

4. In an improved oscillator blade for spreader carts, a rectangular blade body, cylindrical bearings extending outwardly from the upper extremities of said blade body, an upper surface extending substantially the width of said blade body and angularly inclined thereto and depending, oppositely curved fingers extending downwardly from the opposite lower edges of said body.

References Cited in the file of this patent

UNITED STATES PATENTS

| | | |
|---|---|---|
| 85,379 | Going | Dec. 29, 1868 |
| 608,073 | Patterson | July 26, 1898 |
| 721,732 | Nance | Mar. 3, 1903 |
| 1,554,145 | Vugrinec | Sept. 15, 1925 |
| 1,605,502 | Blue | Nov. 2, 1926 |
| 1,791,752 | Cross | Feb. 10, 1931 |
| 2,123,318 | Taylor | July 12, 1938 |